June 27, 1939. E. L. DURRELL ET AL 2,164,173
HYDRAULIC POWER TRANSMISSION APPARATUS
Filed June 22, 1938 4 Sheets-Sheet 2

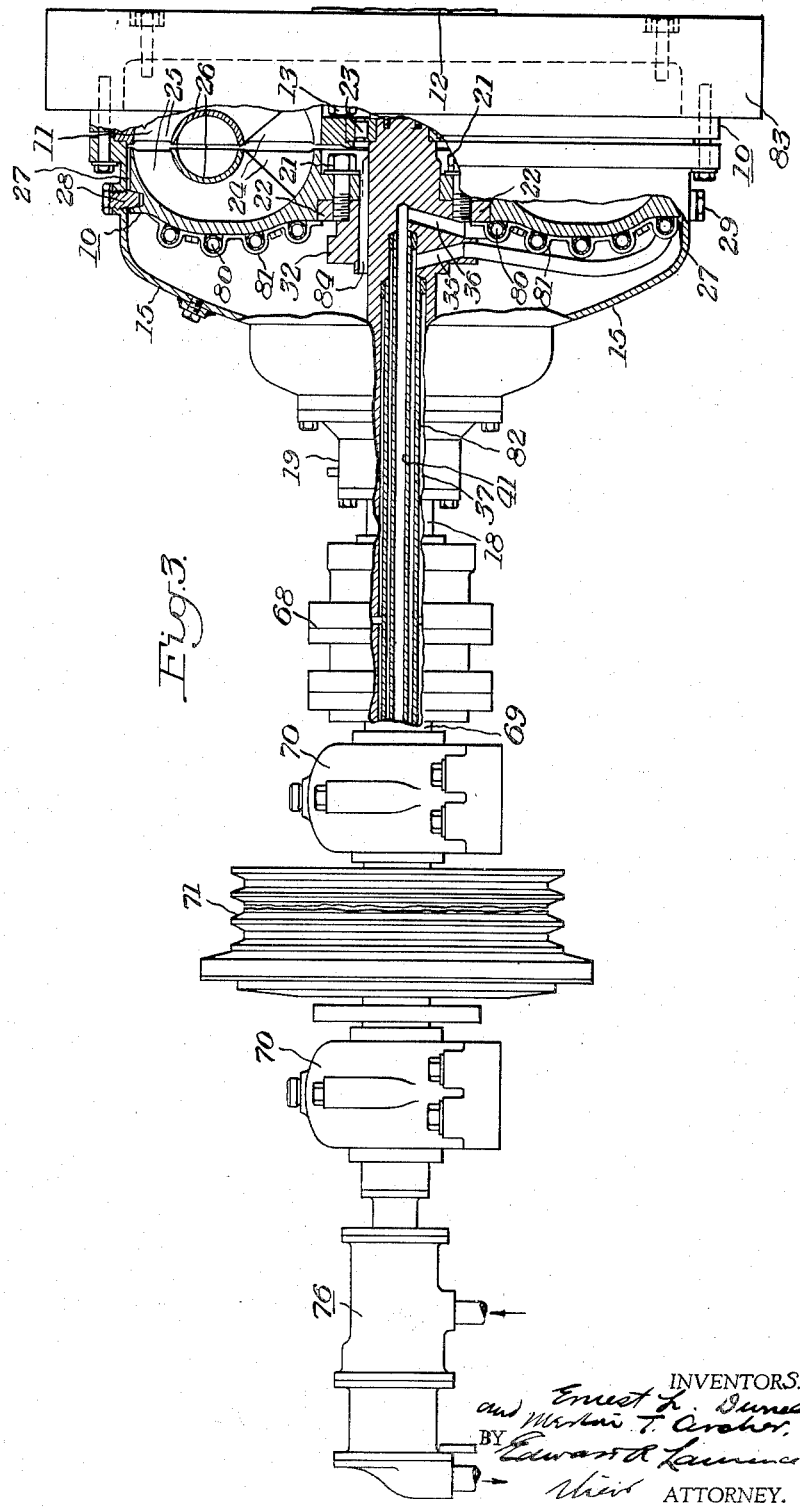

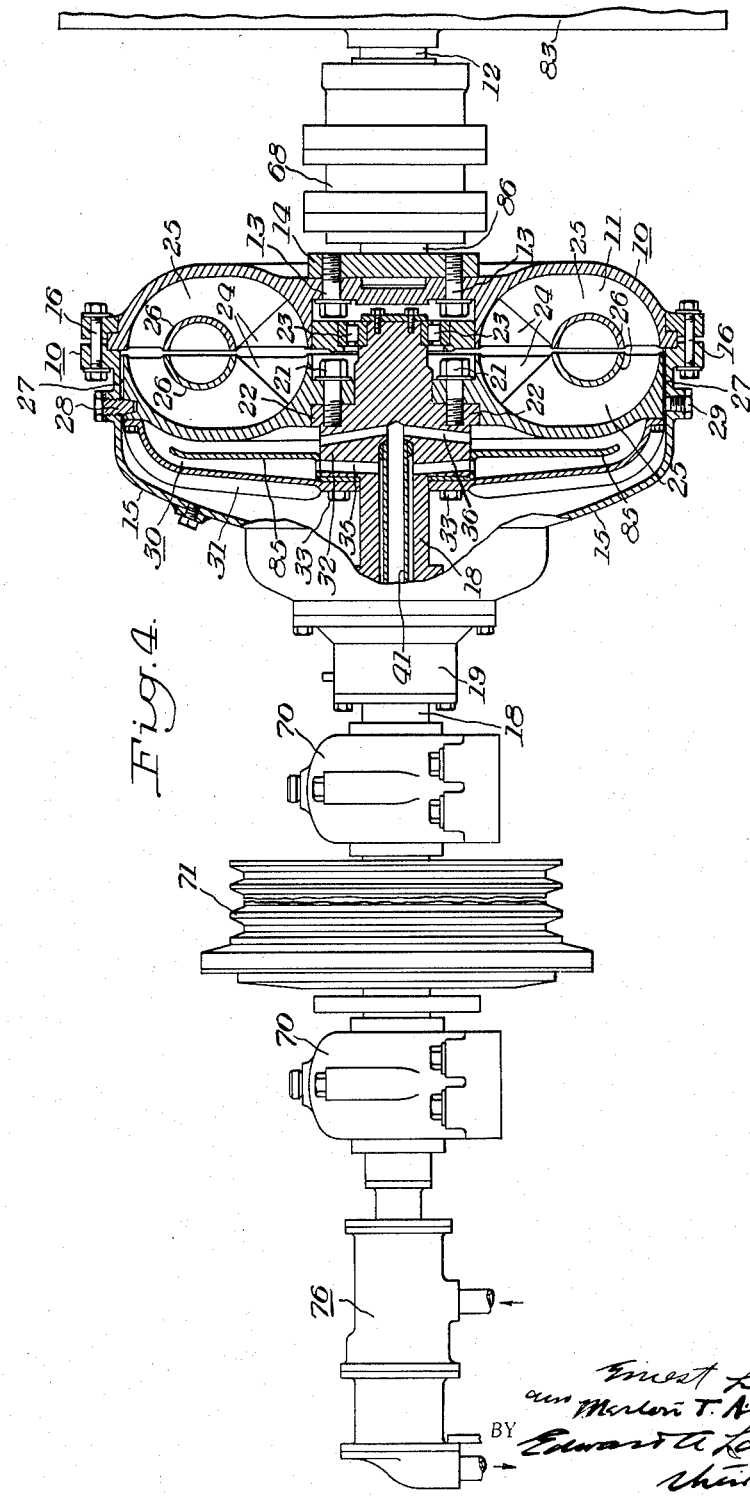

Patented June 27, 1939

2,164,173

UNITED STATES PATENT OFFICE 2,164,173

HYDRAULIC POWER TRANSMISSION APPARATUS

Ernest L. Durrell, Jersey City, N. J., and Merton T. Archer, Toledo, Ohio, assignors to The National Supply Company, Pittsburgh, Pa., a corporation of Pennsylvania Application June 22, 1938, Serial No. 215,192

13 Claims. (Cl. 60—54)

This invention relates generally to hydraulic power transmissions of the well known Foettinger type and more particularly apparatus for cooling the driving liquid of such hydraulic power transmitting devices.

Hydraulic transmissions of the above type provide a simple and highly practical device through which a machine may be driven at constant or varying speeds. This type of hydraulic power transmission replaces or may be used in conjunction with friction or other clutches employed on machines which may be frequently started, stopped, stalled or reversed under any condition of load. Unlike the mechanical friction clutch the hydraulic transmissions of the Foattinger type are capable of withstanding sudden shocks, vibrations and variations in speed and loading without detriment to its parts.

Under all operating conditions hydraulic transmissions of the Foettinger type are capable of transmitting the full torque of the prime mover between the impeller and the runner at any percent of speed, even when the runner is stalled and the prime mover continues to remain in operation these hydraulic devices are generally designed for a barely perceptible slip when operating at full load and speed, but may be operated at any desired slip. In all instances slip does occur and the energy lost due to this slip is transformed into heat, which in ordinary installations is readily dissipated by the circulation of the working fluid through an external circuit where mechanical work is not being performed. In other cases where the slip is low and where stalling of the runner may take place for relatively short periods of time the heat can be dissipated by radiation alone from the external surfaces of the apparatus. It is also possible to aid radiation by the spraying of water or other cooling medium upon the outer surfaces of the mechanism.

However, the hydraulic transmissions referred to in this disclosure are designed principally to withstand one hundred percent slip or stalling of the runner and driven shaft for any desired length of time at full or partial loads. Thus the total energy of the prime mover must be dissipated in the form of heat. Installations of this character are particularly advantageous for use in driving rotary well drilling machinery wherein the bit may suddenly or frequently be stalled, but the power of the prime mover still is continuously delivered to the impeller of the hydraulic transmission and the full torque of the prime mover delivered to the machinery by the runner, without damage to the machinery. When a bit is stalled the driller operates the drawworks, raising the drill string to release the bit from its jammed position. When the bit has been released and the load on the drill string is reduced to a value less than the capacity of the prime mover the runner of the hydraulic transmission will pick up the load and again rotate the drill string and bit. The bit is then lowered to the bottom of the hole and drilling is resumed until it may again become jammed. By certain manipulation of the drawworks machinery it is possible to maintain the full torque of the prime mover, attempting to rotate the drill string while freeing the bit from its jammed position. In this case the prime mover and the impeller of the hydraulic power transmission continues to operate while the drill string and runner of the hydraulic device are stalled or nearly so. This stalling may or may not be frequent and the duration of the stalls may be momentary or for an extended period of time; therefore, it is necessary to provide a cooling system for the hydraulic apparatus, capable of dissipating the full energy of the prime mover in the form of heat.

When pumping mud to the bottom of the rotary drill string it is possible for cave-ins or other obstructions to retard or completely stop the circulation of the flowing mud. In such cases the hydraulic transmission must operate at high slips or even stall until circulation has been regained. Here again the prime mover and the impeller of the hydraulic apparatus will continue to operate while the runner and mud pump are stalled or nearly so. Such a condition may last for an appreciable time, therefore, again it is necessary to provide sufficient cooling to dissipate the entire energy of the prime mover in the form of heat.

Again in the installation of a braking mechanism for drawworks and the like, the cooling system must be capable of dissipating the total heat of the energy input.

This invention is directed to these ends which are not salient in the ordinary installations.

The principal object of this invention is the provision of apparatus for cooling the driving fluid of the hydraulic transmission.

Another object is the provision of an independent annular cooling chamber within a hydraulic transmission arranged to receive a circulating fluid to absorb the heat to be dissipated from the hydraulic power transmitting fluid.

Another object is the provision of an independent cooling chamber within a hydraulic power transmitting apparatus wherein the walls forming said cooling chamber are common to the chambers containing the power transmission fluid.

Another object is the provision of an independent cooling chamber within a hydraulic power transmitting apparatus arranged to receive a circulating cooling fluid at a point remote of the axis of rotation thereof.

Another object is the provision of means for circulating a cooling fluid through an independent cooling chamber within a hydraulic power transmission through the axis of rotation thereof.

Another object is the provision of an independent fluid circulating system within the casing of a hydraulic power transmission for absorbing the heat to be dissipated by the power transmission fluid therein.

Other objects and advantages will appear hereinafter in the following description and claims.

In the accompanying drawings a practical embodiment of the principles of this invention is illustrated wherein:

Fig. 3 is a view similar to Fig. 2 illustrating a spiral coil within the casing of a hydraulic transmission for circulating a cooling medium to absorb heat from the power transmitting fluid and illustrating a dual tubular fluid conduit circuit coaxially within the core of the shaft for transmitting the cooling fluid to said coil.

Fig. 4 is a vertical section of a rotary shaft illustrating a modified form of the cooling chamber within a hydraulic transmission.

Figure 1:
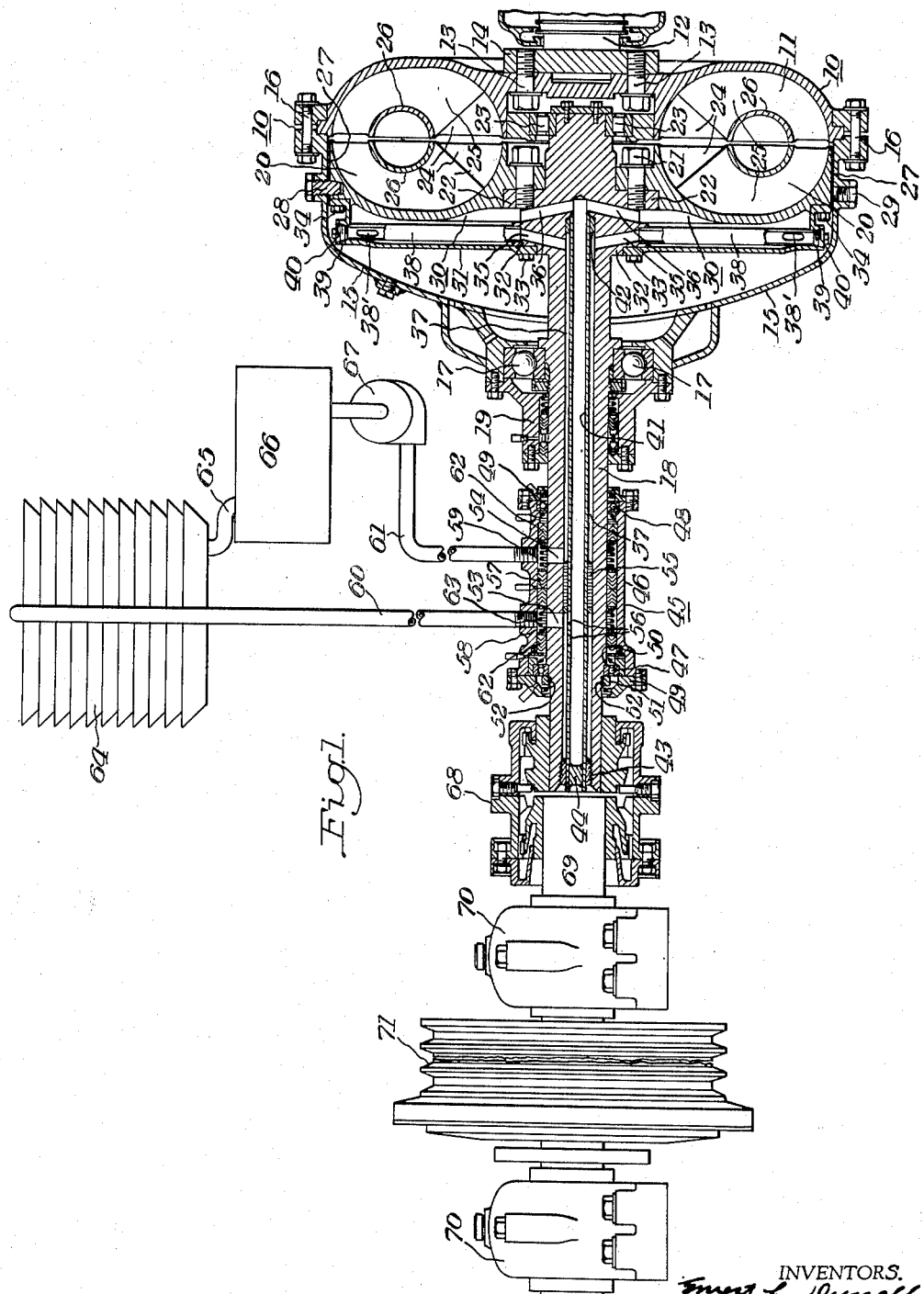
Fig. 1 is a vertical section of a rotary shaft illustrating the application of the cooling system for a hydraulic power transmission wherein the cooling fluid is transmitted to a cooling chamber in the coupling from a point intermediate the ends of the shaft.

Referring to Fig. 1 of the drawings, 10 represents a hydraulic coupling which is made up of the impeller 11 mounted on the rotary driving shaft 12 by means of the bolts 13 secured to the flange 14. The shaft 12 may be that of an electric motor shaft, a crank shaft of an internal combustion engine or other type of prime mover. The casing 15 of the hydraulic power transmission is bolted at one end to the perimeter of the impeller as indicated at 16. The other end of the housing 15 is reduced in diameter and is provided with suitable anti-frictional bearings 17 to rotatably support the same on the intermediate driven shaft 18. The reduced end of the housing is also provided with a suitable stuffing box 19 to prevent the escape of the power transmitting medium contained within the unit. Adequate lubricating facilities are also provided on the stuffing box as indicated.

The runner 20 is mounted on the intermediate driven shaft 18 by means of the bolts 21 secured to the integral flange 22. The shaft 18 extends into the center of the impeller 11 and is arranged to support the anti-frictional bearings 23 therebetween.

The impeller 11 and the runner 20 are provided with alternate long and short vanes 24 and 25, respectively, integral with the shell of each element, and these vanes support the core guide members 26. An annular passageway 27 between the perimeter of the runner and the casing housing connects the working chambers with the casing permitting the circulation of the power transmitting fluid therebetween.

When it is desired to dispense with action of the hydraulic transmission the clutch pins 28 may be inserted through the housing into the runner as indicated on the drawings. They are removed and plugs 29 inserted in their stead when the transmission is in use. A manually operated positive jaw clutch may be employed in place of the pins 28. However the simpler structure is illustrated for the sake of clarity.

The power transmitting fluid or working liquid is cooled by means of an independently circulated cooling fluid. In Fig. 1 the cooling fluid is circulated in the chamber 30 which is formed by the annular housing 31 secured at its inner end to the enlarged portion 32 of the shaft 18 by means of the bolts 33 and secured at its outer perimeter to the runner by means of the bolts 34. This housing may be formed integral with the runner if desired.

One or more radial passageways 35 and 36 are provided through the enlarged portion 32 of the shaft 18 for connecting the bore 37 thereof with the cooling chamber 30. A shoulder is formed adjacent the outer end of the passageways 35 to receive the end of the radially disposed tubes 38. These tubes are inserted through the threaded openings 39 and their length is greater than the distance between the shoulders formed in the passageways 35 and the inner surface of the housing 3. Thus when installed the tubes do not completely enter the chamber 30 but their outer ends lie in the threaded openings 39 and are secured in place by means of the threaded plugs 40.

The tubes 38 are provided with a transverse opening 38' adjacent their outer ends to permit the cooling fluid carried thereby to be discharged into the cooling chamber 30 at the outer periphery thereof. The cooling fluid then circulates through the chamber 30 and is discharged therefrom through the passageways 36 to the bore of the shaft 18. This construction permits the cooling fluid to come in direct contact with the shell of the runner and housing 31, both of which contain the working liquid. With the exception of the outer perimeter of the enlargement 32 of the shaft 18, the cooling chamber is completely surrounded by the working fluid. Thus the rate of heat exchange from the working fluid to the cooling fluid is efficiently performed.

The bore 37 of the shaft 18 is divided into two fluid passageways by means of the coaxially positioned tube 41 secured therein. The inner end of the bore is provided with a shoulder having a packing 42 seated thereon and arranged to receive the inner end of the tube 41 which is held in position at its outer end by means of the annular threaded plug 43 secured thereto and threadably engaging the bore 37. The outer end of the tube 41 is closed by means of the solid plug 44.

The cooling fluid take-off 45, as shown in Fig. 1, comprises a tubular housing 46 supported on the shaft 18 by means of the antifrictional bearings 47 and 48 which are secured in position by the end rings 49. The inner race of the bearing 47 is held against the shoulder 50 on the shaft 18 by means of the internally threaded nut 51 which engages the short complementary threaded section 52. This construction prevents the take-off 45 from moving axially of the shaft 18.

The shaft 18 is provided with two radially disposed ports 53 and 54 spaced longitudinally from one another intermediate of the ends of the tubular housing 46. These ports connect the bore 37 with the space formed by housing 46. The tube 41 is packed with respect to the bore 37 between the inner ends of the ports 53 and 54 as indicated at 55 and holes 56 are formed in the wall of the tube 41 between this packing and the plugged end thereof. Thus the packing 55 segregates the ports 53 and 54 and two independent fluid passageways leading to the cooling chambers are formed by the tube 41.

A packing 57 is provided between the perimetral surface of the shaft 18 and the housing 46 intermediate the ports 53 and 54, thereby providing independent annular cooling fluid chambers 58 and 59 which are connected exteriorly of the housing 46 to the pipes 60 and 61 respectively. A packing 62 is also provided between the shaft 18 and the housing 46 on the outer sides of the chambers 58 and 59 and these chambers are maintained open by means of the springs 63 which hold the packings 57 and 62 in their proper positions as indicated. Relative motion occurs between these packings and the shaft 18 so adequate lubricating facilities are also supplied as indicated on the drawings.

The pipe 60 leads from the cooling fluid take-off 45 to a suitable cooling device. The cooling fluid is circulated through a heat exchanger such as a cooling tower 64. The cooling fluid is then taken from the cooling tower and conveyed through the pipe 65 to the reservoir 66 from whence it may be recirculated by means of the pump 67 to the pipe 61, thence through the chamber 59, the port 54, the bore 37 of the shaft 18, the passageways 35, the tubes 38, and through the openings 40 into the cooling chamber 30. The cooling fluid absorbs heat from the shell of the runner and the housing 31 and returns from the chamber 30 through the passageways 36, the bore of the tube 41, the holes 56 through the walls thereof, the port 53, the chamber 58, the pipe 60, the cooling tower 64 and the pipe 65 thus returning to the reservoir 66.

If a refrigerant is employed as a cooling fluid it will of course be necessary to employ the proper apparatus for compressing and condensing the same before it is again circulated to the cooling chamber through an expanding valve.

The other end of the intermediate driven shaft 18 is supported by the equalizing mechanical coupling 68 which in turn is supported on one end of the second driven shaft 69 supported by the bearings 70. A V-grooved drive pulley 71 or its equivalent is secured to the shaft 69 intermediate of the bearings 70 for driving a rotary drilling rig or other apparatus.

Figure 2:
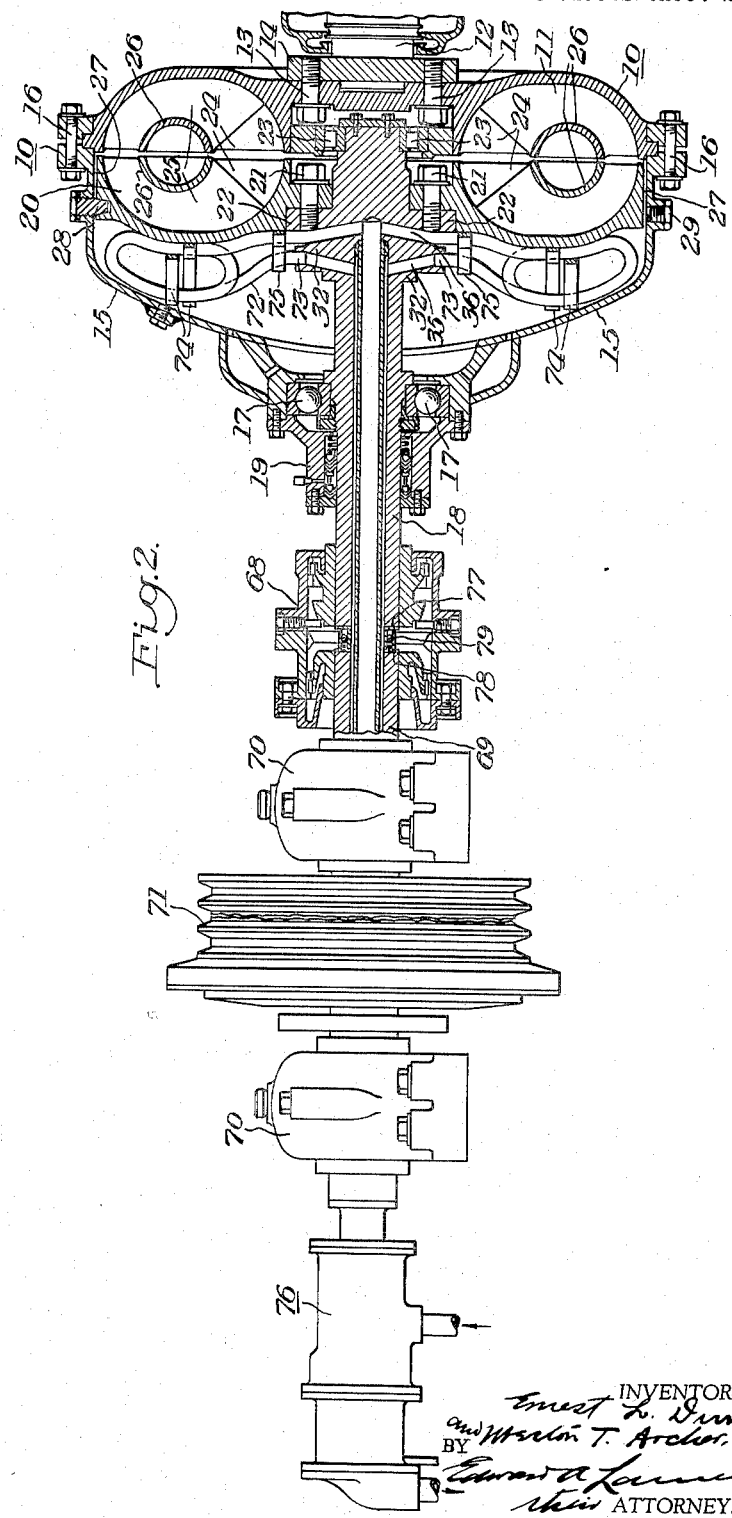
Fig. 2 is a vertical section of a rotary shaft illustrating a plurality of coils within the casing of a hydraulic power transmission for cooling the power transmitting fluid and wherein the cooling fluid is transmitted to said coils, through the center of the shaft from the end thereof.

In the structure illustrated in Fig. 2 the cooling chamber 30 has been replaced by a series of radially disposed coils the receiving and discharge ends of which are secured in the enlarged portion 32 of the intermediate driven shaft 18 as shown at 73. The bight of the coils 72 are braced by the tie rods 74 which are tied to the outer and inner turns of alternate coils and are bolted to the shell of the runner 20 therebetween. A similar bracing strap 75 is provided adjacent the enlargement 32 of the shaft 18.

The stationary cooling fluid take-off 76 is rotatably supported on the end of the second driven shaft 69 and is arranged to be connected to suitable cooling apparatus similar to that shown in Fig. 1. Since the cooling fluid take-off is not supported on the intermediate driven shaft 18 the tube 41 is continued through the equalizing coupling and through the bore of the shaft 69. In order to seal the fluid passageway between the perimetral surface of the pipe 41 and the coupling 68 to prevent leakage of the cooling fluid therein a pair of concentrically arranged flanged collars 77 and 78 are secured to the ends of the shafts 18 and 69 respectively. A packing 79 is held between the concentric portions of the collars 77 and 78, thereby providing a fluid seal for the cooling fluid as it passes the equalizing coupling from the shaft 69 to the shaft 18 on its way to the cooling coils 72.

In Fig. 3 the cooling chamber 30 is replaced by a single spirally wound cooling coil 80 which is secured to the shell of the runner by means of the radially disposed straps 81 which bridge each turn of the coil and are bolted or welded to the shell therebetween. This structure only requires one radial passageway 35 and one radial passageway 36. It should also be noted that there is no seal provided for the equalizing coupling 68 between the shafts 18 and 69. This is accomplished by the use of an outer concentric tubing 82 which surrounds the tubing 41 in the bore of these shafts. Thus the cooling fluid flowing to the cooling coils passes between the tubings 82 and 41 and enters the passageway 35 passing through the coil 80 and returns through the passageway 36, and the tubing 41 to the takeoff 76 on the end of the shaft. Since there is no fluid between the pipe 82 and the bores of the shafts 18 and 69 there is no need of a packing at the coupler 68.

Fig. 3 also illustrates the impeller 11 secured to a flywheel 83 in place of being bolted directly to the crank shaft. In most cases the flywheel action of the hydraulic coupling 10 is sufficient. However an ordinary flywheel is readily adaptable to the structure as illustrated.

Numeral 84 represents a passageway extending longitudinally of the shaft 18 through the enlarged portion 32 thereof for connecting the reservoir 15 with the inner ends of the passages formed by the vanes 24 and 25 of the impeller 11 and the runner 20. This passageway 84 aids in the circulation of the working fluid from the working chamber through the passageway 27 and the reservoir 15.

The bracings 74 and 75 for the coils 72 as illustrated in Fig. 2 and the straps 81 as illustrated in Fig. 3 provide improved heat transfer mediums by conductivity from the working fluid to the cooling fluid.

In Fig. 4 the cooling chamber 30 is divided in two parts by means of the radially disposed annular disk 85 the flange portion of which fits over one-half of the peripheral surface of the enlarged portion 32 of the shaft 18 and is secured thereto under the housing plate 31 by means of the bolts 33. The cylindrical portion of the flange of the disk 85 is also provided with openings aligned with the passageways 35 to permit the cooling fluid to enter the chamber 30 on one side of the disk, pass to the perimeter thereof and back on the other side of the disk to the passageways 36 and thence out through the tube 41.

The housing 31 of the cooling chamber 30 is shown corrugated in Fig. 4 to provide increased surface for transferring heat from the working fluid to the cooling fluid.

The coupling 68 is shown between the hydraulic transmission 10 and the crank shaft 12 thereby requiring a short stub shaft 86 which is secured to the impeller 11 in the same manner as that illustrated in Fig. 1. Since the equalizing coupler 68 is on the driving side of the hydraulic coupling 10 there is no need of a packing therefor and the shaft 10 extends through the bearings 70 supporting the rotary drilling dig driving pulley 71 therebetween and the cooling fluid take-off 70 on the end thereof.

We claim:

1. In a hydraulic power transmitting apparatus, a driving shaft and a driven shaft, an impeller fixed on the driving shaft, a runner fixed on the driven shaft, said impeller and runner conjointly defining a vortex containing a power transmission liquid, a juxtaposed sealed independent annular cooling chamber having inlet and outlet connections in communication with axially disposed conduits in one of said shafts through which a cooling fluid under pressure is circulated.

2. In a hydraulic power transmitting apparatus, a driving shaft, a driven shaft, an impeller fixed on the driving shaft, a runner fixed on the driven shaft, said impeller and runner conjointly defining a vortex containing a power transmission liquid, a chamber adjacent to and in communication with the vortex and containing a supply of transmission liquid, and a cooling chamber disposed in sealed relation within said chamber and having inlet and outlet connections with axially disposed conduits in one of said shafts through which a fluid under pressure is circulated whereby heat is transferred from the impeller, runner and transmission liquid.

3. In a hydraulic power transmitting apparatus, a driving shaft and a driven shaft, an impeller fixed on the driving shaft, a runner fixed on the driven shaft, said impeller and runner conjointly defining a vortex containing a power transmission liquid, a juxtaposed sealed independent annular cooling chamber having inlet and outlet connections in communication with axially disposed conduits in one of said shafts through which a cooling fluid under pressure is circulated, said inlet adapted to deliver cooling fluid to said cooling chamber at a point remote from the axis of rotation.

4. In a hydraulic power transmitting apparatus, a driving shaft and a driven shaft, an impeller fixed on the driving shaft, a runner fixed on the driven shaft, said impeller and runner conjointly defining a liquid operating chamber containing a power transmission liquid, a juxtaposed sealed independent annular cooling chamber having inlet and outlet connections in communication with axially disposed conduits in one of said shafts through which a cooling fluid under pressure is circulated, said inlet connection including a radially disposed tube perforated at its outer end.

5. In a hydraulic power transmitting apparatus, a driving shaft and a driven shaft, an impeller fixed on the driving shaft, a runner fixed on the driven shaft, said impeller and runner conjointly defining a liquid operating chamber containing a power transmission liquid, a juxtaposed sealed independent annular cooling chamber having inlet and outlet connections in communication with axially disposed conduits in one of said shafts through which a cooling fluid under pressure is circulated, said axial conduits arranged in telescopic relationship and respectively in communication with a supply of cooling fluid through spaced transverse outlets in the shaft intermediate its ends, sealing means between said shaft outlets, to separate the flow of fluid in one conduit from that of the other.

6. In a hydraulic power transmitting apparatus, a driving shaft and a driven shaft, an impeller fixed on the driving shaft, a runner fixed on the driven shaft, said impeller and runner conjointly defining a liquid operating chamber containing a power transmission liquid, a juxtaposed independent annular cooling chamber having inlet and outlet connections in communication with axially disposed conduits in one of said shafts through which a cooling fluid is circulated, a third transmission shaft in axial alignment with and driven by said driven shaft, said axial conduits extending through the third shaft, wherein sealing means are provided to separate the flow of fluid in one conduit from that of the other, and means for circulating fluid through the conduits and cooling chamber whereby the temperature of the rotor impeller and operating liquid is controlled.

7. In a hydraulic power transmitting apparatus, a driving shaft, a driven shaft, an impeller fixed on the driving shaft, a runner fixed on the driven shaft, said impeller and runner conjointly defining a liquid operating chamber containing a power transmission liquid, an annular storage chamber adjacent to and in constant communication with the operating chamber and containing an additional supply of transmission liquid, and a cooling chamber disposed in sealed relation within said storage chamber and having inlet and outlet connections with axially disposed conduits in one of said shafts through which a fluid under pressure is circulated whereby heat is transferred from the impeller runner and transmission liquid, the walls of said cooling chamber being common to said cooling chamber and said storage and power transmission chamber.

8. In a hydraulic power transmitting apparatus a driving shaft and a driven shaft, an impeller fixed on the driving shaft, a runner fixed on the driven shaft, said impeller and runner conjointly defining a liquid operating chamber containing a power transmission liquid, a juxtaposed sealed independent annular cooling chamber having inlet and outlet connections in communication with axially disposed conduits in one of said shafts through which a cooling fluid under pressure is circulated, said inlet connection including a radially disposed tube perforated at its outer end, a radial opening through the peripheral portion of the cooling chamber through which said tube is assembled into operative position, and means for sealing said opening.

9. In a hydraulic transmission, the combination of an impeller member and a runner member, said members defining a working chamber, a storage chamber rotatably carried by one of said members and connected to the working chamber, said chambers containing the working liquid, a cooling chamber within the storage chamber and sealed therefrom, and means for passing a cooling liquid under pressure through the cooling chamber.

10. In a hydraulic transmission the combination of an impeller member, a runner member, said members having opposed operating chambers, a working liquid arranged to operate between said members in said operating chambers, an annular storage chamber adjacent one of said members and in communication with said operating chambers for carrying a part of the working liquid, an annular partition in said storage chamber cooperating with said one member to form a cooling chamber, means for circulating a cooling fluid through said cooling chamber, and an annular disk dividing said cooling chamber to direct the flow of the cooling fluid therethrough.

11. In a hydraulic transmission, the combination of an impeller member and a runner member, said members defining a working chamber, a storage chamber rotatably carried by one of said members and connected to the working chamber, said chambers containing the working liquid, a coil in the storage chamber and sealed therefrom, and means for passing a cooling liquid under pressure through the coil.

12. In a hydraulic transmission the combination of an impeller member, a runner member, said members having opposed operating chambers for receiving a working liquid, means secured to one of said members and enclosing the other of said members forming a storage chamber in communication with said operating chambers for carrying a part of said working liquid, means defining an independent chamber in said enclosed member, and means for circulating a cooling fluid in said independent chamber for absorbing heat from the working liquid.

13. In a hydraulic transmission the combination with an impeller member and a runner member conjointly defining an operating chamber containing a power transmitting liquid, of means secured to one of said members and enclosing the other of said members forming a reservoir in communication with said operating chamber for carrying a part of said working liquid, and means defining an independent cooling chamber between the reservoir and the operating chamber through which a fluid is circulated for cooling the transmission.

ERNEST L. DURRELL.
MERTON T. ARCHER.